Patented Jan. 11, 1944

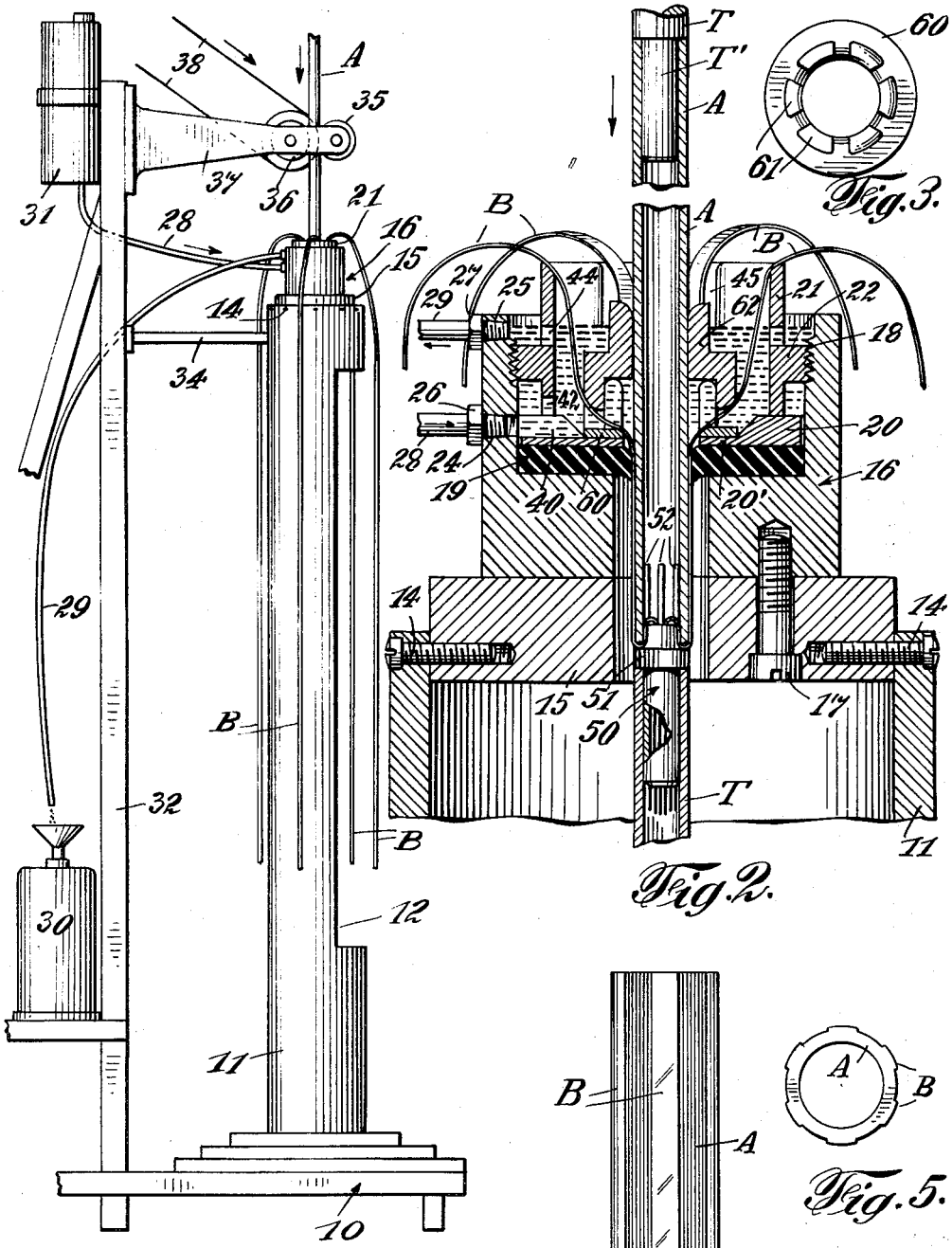

2,339,211

UNITED STATES PATENT OFFICE 2,339,211

METHOD AND APPARATUS FOR MAKING TUBULAR ARTICLES

John N. Whitehouse, Camden, N. J.

Application April 23, 1941, Serial No. 389,862

6 Claims. (Cl. 18—1)

This invention relates to an improved method and apparatus for making composite tubes from plastic material.

An object of the present invention is to produce, as a new article of manufacture, a composite tube of plastics or similar material, made up of a foundation tube of plastic material having substantially homogenized therewith a plurality of longitudinally extending strips of plastic material, which strips are on the exterior of the foundation tube.

Another object of the invention is to produce a tube of the foregoing character in which strips of plastic material are substantially homogenized into the surface of a foundation tube in spaced relation therearound and extending longitudinally thereof.

Another object of the invention is to produce a tube of the foregoing character in which the strips have outer surfaces raised relative to the outer surface of the foundation tube.

A further object of the invention is to produce a tube of the foregoing character in which the finished article has a smooth external surface.

An additional object of the invention is to provide new, simple and efficient mechanism for simultaneously applying a plurality of strips to a foundation tube in such fashion that the strips become substantially homogenized with the material of the foundation tube.

A further object of the invention is to provide improved mechanism for accomplishing the foregoing, which mechanism comprises in part, a resilient die member through which a tube together with strips can be passed subsequent to the application of a solvent to both the tube and the strips whereby the resilient die so presses the solvent treated strips and the solvent treated tube together as to form a substantially homogeneous composite tube.

A further object of the invention is to provide means for securing the ends of a plurality of strips to the end of a foundation tube in such fashion that the strips can be forced into surface merging contact with the foundation tube together with mechanism for guiding the strips during such surface merger.

A still further object of the invention is to provide new, simple and efficient methods for making a composite tube of the type before described.

In carrying out the foregoing and other objects of the invention, it is the intent thereof to provide means for and methods of making a new type of composite tube of plastic or other similar material. The term "plastic" as used herein, is to be understood as defining a nitrated or acetated cellulose material or any other synthetic material, many of which are well known to the art, or are being constantly developed, and are capable of meeting the requirements of the present invention, namely that the material be readily soluble in a volatile solvent whereby two surfaces treated with a solvent can be merged into a substantially homogeneous construction. To this end the invention contemplates the use of a foundation tube of such material to which is applied a plurality of longitudinally extending strips preferably at spaced intervals therearound, which strips are so united with the material of the foundation tube as to become substantially homogeneous therewith. To accomplish this intended purpose, the foundation tube and the strips may be made of the same material, or may be made of different materials having the qualifications set out above. The respective parts may have different characteristics such as appearance, finish and the like. As an example, the material of the foundation tube may be of one kind of plastics and of a uniform color. The material of the strips likewise may be of plastic material as defined hereinbefore and of the same kind as the tube or may be of a different kind and a different color than the material of the foundation tube. Consequently, the composite tube may present to the eye an effect entirely different from that of any composite tube heretofore made since this tube can be made up of alternate stripes of different color and the color of the various strips themselves may be different, one from the other.

In order that such composite tubes may be made, the invention provides a method of securing the strips to the foundation tube, which method comprises initial securing of strips to the end of a tube in proper spaced relation and then application of a suitable solvent to both the strips and the tube, followed immediately by the application of such pressure to the strips and the tube as to force the strips into intimate contact with the surface of the tube. Due to the treatment of both the tube and the strips with such solvent, it follows that this application of pressure to the strips so operates as to merge the material of the strips into the material of the tube and vice versa, with the result that the finished article is a substantially homogeneous structure made up of the foundation tube and the strips. If desired, the finished article may present a ribbed surface due to the application of the strips or, further, this finished article may present a smooth surface due to the processing of the tube following the application of the strips to the foundation tube in the manner set forth in my copending application, Serial Number 307,208, now U. S. Patent No. 2,286,045, i. e., by being hammer-molded while on a mandrel. For this purpose use may be made of a pair of members having cavities in their opposite surfaces, which cavities cooperate to form a cylindrical opening of the desired diameter. The pair of members may have imparted thereto rapid movements of approach and separation until the tube being treated has been hammered to the predetermined size.

In order that a tube, as before described, can be processed in the manner set forth, suitable mechanism has been provided for accomplishing this purpose. Such mechanism will be described in detail in the accompanying drawing illustrating one form of the invention, wherein Fig. 1 is a side elevation of suitable mechanism for practising the process;

Fig. 2 is an enlarged vertical section through the solvent reservoir and resilient die, housings and the like;

Fig. 3 is a top view of one of the guide members utilized in the invention;

Fig. 4 is a side elevation of a finished article in which the applied strips form raised ridges of the surface of the tube, and Fig. 5 is an end view of such article.

Referring now to the drawing, 10 indicates generally a base supporting the mechanism employed in practising the invention. Secured to the base is an upright column 11 in the form of a hollow tube, a part of the wall of which is cut away as at 12. Fastened in the top of the column 11 by screws 14 is a centrally orificed ring member 15. A cup member 16 is fastened to the ring 15 by a number of screws 17, one of which is shown in Fig. 2. The cup member 16 is provided with a bore aligned with the orifice in the ring 15 and is counterbored with the wall of the counterbore threaded as at 18.

A resilient die member 19 in the nature of rubber or other suitable material is seated in the bottom of the cup 16 and is retained therein by a retainer ring 20 locked in place by means of a cylindrical member 21 having an external flange 22 threaded to engage the threads 18. The rubber die member 19 is provided with a central aperture of suitable diameter for the purposes to be explained later.

The cup 16 has two openings 24 and 25 in the wall thereof into which openings are threaded nipples 26 and 27 attached to hoses 28 and 29 respectively. The upper hose 29 is extended downwardly to discharge into a proper container 30 while the lower hose 28 is in communication with a suitable container 31. The containers 30 and 31 may be supported by an upright 32 to which the upper end of the column 11 may also be secured by a stay 34. The upright 32 also serves to support rollers 35 and 36 mounted in a bracket 37. The roller 36 can be power driven as by a belt 38 or in any other suitable manner.

The inner portion of the ring 20, which compresses the die 19 and retains it in place is of reduced thickness as shown at 20'. The outer portion of the ring 20 may have one or more slots 40 in the top thereof, one of which is shown in Fig. 2 as being in line with the opening 24 in the wall of the cup 16. Likewise the cylindrical member 21 may be provided with a plurality of lower holes or openings 42 in the wall thereof below the flange 22 and also with a plurality of similar holes or openings 44 above the flange 22. The purpose of the slots 40 and the holes 42 and 44 is to permit the ready flow of liquid, i. e., a suitable solvent, such as acetone, or any other material capable of performing the desired functions, from the container 31 to the container 30 with a constant level of liquid in the cup being maintained by the proper arrangement of the inlet and outlet openings 24 and 25 and the conduits 28 and 29 in communication therewith. The upper edge of the member 21 may be rounded as shown in Fig. 2 and if desired this member may be provided with a plurality of upstanding internal ribs 45 serving to define zones in such ring.

The mechanism just described, plus other parts to be later described, can be used for processing a tube A of material as hereinbefore defined. In order that such tube A can be processed, use is made of a member indicated generally at 50 for securing the ends of a plurality of strips B to one end of the tube A. The strips B are also of material as defined herein but may be of different color or of different quality. The member 50 is of generally tubular form having an external flange 51. Extending upwardly from the top of the member 50 are a plurality of pins or pegs 52 of suitable number to provide spaces between adjacent pegs in number corresponding to the number of strips B to be homogenized with the tube A. In the arrangement illustrated, three of six pins or pegs 52 are shown.

As the initial step in the process, the ends of the respective strips B are inserted into the member 50 with each strip passing through a space between adjacent pins 52 and extending downwardly into the member 50. They may be retained in this member in any desired fashion, such as by friction, or once all of the members are in place, they may be locked together by the application of a small amount of solvent. After the strips B have been properly secured in the member 50, they are bent downwardly so that the end of the tube A can be slipped over the upstanding pins 50 and downwardly over the upper part of the member 50 until the strips are confined between the inner wall of the tube A and the upstanding part of the member 50 and between the lower edge of the tube A and the upper surface of the flange 51. When the strips are thus properly secured to the end of a tube A, this lower end of the tube A is passed through a guide member 60 which has a ring-like base and a plurality of upstanding posts 61, which in the present instance are six in number and are spaced to provide six passageways of width corresponding closely to the width of the various strips B. A hollow cap member 62 is then inserted over the upper ends of the posts 61 and held frictionally to retain the strips B in the spaces between the respective posts 61. The lower outer edge of the cap 62 is rounded as shown in Fig. 2.

The foregoing steps are carried out manually in some suitable fashion prior to introduction of the tube strips and guide assembly into the cup 16. Normally a metallic guide or pilot tube T is held by the resilient die 19 with the upper end of the tube T extending above the upper surface of the cup 16. This tube T has an external diameter corresponding to the external diameter of the tube A and this diameter is larger than the normal diameter of the opening in the die 19 so that the wall of this opening is pressed downwardly and extended as shown in Fig. 2.

With a metallic guide or pilot tube T in position with the upper end thereof extending above the top of the cup 16, the lower end of the member 50 is inserted into such guide tube and forced downwardly until the lower end of the tube A enters the opening in the die 19. At the same time the guide member 60 and cap 62 are introduced into the cup 16 with the base of the member 60 resting on the part 20' of the ring 20. The expanses of strips B then extend over the top of member 21, being positioned at spaced intervals by the upstanding ribs 45. Tube A is then forced downwardly by the rollers 35, 36 carrying this tube and the attached strips B through the opening in die 19. Solvent circulates into and out of the cup 16 and contacts the surface of the tube A and the strips B as these parts pass through this cup. Consequently, as the foundation tube A and the strips B are forced through this resilient die, the solvent treated parts are forced together by the die so that the strips become substantially homogenized with the foundation tube. The resilient die assures that intimate contact between the solvent treated surfaces is obtained but at the same time, due to dimensioning of the parts, escape of solvent in any appreciable quantity is prevented.

The downward movement of the foundation tube and the strips is continued until the upper end of the foundation tube approaches the rollers 35 and 36. At this time a second guide or pilot tube T' having an extension T'' to fit in the upper end of the tube A is engaged with tube A and the downward movement of this tube A continued by forcing the pilot tube T' downwardly. Such downward movement of tube T' continues until the part thereof of maximum diameter fits in the opening in the die 19, at which time the composite tube made up of the parts A and B can be released from the reduced end of the upper guide tube T' and removed from the opening 12 in the column; it being understood that the first guide tube T was similarly removed as soon as the lower end of tube A had begun passing through the die 19. Thus as a finished tube has completed its passage through the die, a guide or pilot tube takes its place keeping the opening in the die plugged against any loss of solvent from the cup.

The finished article, as shown in Figs. 4 and 5, is a composite tube wherein a plurality of longitudinally extending strips are substantially homogenized with the foundation tube. If desired, the finished article can retain the shape shown in Figs. 4 and 5 wherein the initial separate strips B form substantially homogeneous ribs on the surface of the tube. However, if it is desired that the tube have a smooth finish, such finish can be accomplished by further processing the article in the manner set forth in my copending application, Serial Number 307,208.

Production of the article produced in the manner hereinbefore described makes possible the utilization of a base or foundation tube of one quality or kind of plastic material as herein defined together with added strips of another or different quality or kind of plastic material. Consequently, color designs of pleasing character, such as intermittent stripes and the like can be obtained. The invention moreover makes possible the use of a relatively inexpensive foundation tube in conjunction with strips of expensive material, which strips are applied to and become part of the composite tube. It will be evident that the possibilities of the invention are limited only by limitations of color, quality, design and the like.

From the foregoing it will be seen that the present invention provides an improved method and apparatus for making composite tubes from the plastic material hereinbefore defined. It is to be understood that the invention is capable of modification beyond the illustrated and described embodiments set forth herein and accordingly, the only limitations to be imposed thereupon are those set forth in the following claims.

What is claimed is:

1. The method of producing a new article of manufacture comprising progressively advancing a tube of plastic material and a plurality of strips of plastic material through a common solvent bath, and immediately thereafter pressing said strips against said tube to become substantially homogenized therewith and to extend longitudinally thereof.

2. The method of producing a new article of manufacture comprising progressively advancing a tube of plastic material and a plurality of strips of plastic material through a common solvent bath with the strips guided in spaced relation, and immediately thereafter pressing said strips against the surface of said tube to become substantially homogenized therewith and to extend longitudinally of the tube at spaced intervals therearound.

3. Apparatus for applying strips of plastic material to a tube of plastic material comprising a reservoir for a solvent for said tube and strips, a resilient die in the bottom of said reservoir and apertured for the passage of said tube and said strips, and guide means located partly in said reservoir for guiding strips of said material to said tube whereby said strips pass through solvent in the reservoir and through the die along with the tube.

4. Apparatus for applying strips of plastic material to a tube of plastic material comprising a resilient die apertured for the passage of said tube and said strips and means for applying solvent to said tube and all the surfaces of said strips immediately before their passage through said die, said die serving to wipe solvent from the outer surfaces of said strips and the outer surface of the tube between the strips.

5. Apparatus for applying strips of plastic material to a tube of plastic material comprising a reservoir for a solvent for said tube and strips, a resilient die in the bottom of said reservoir and apertured for the passage of said tube and said strips, guide means located partly in said reservoir for guiding said strips to said tube whereby said strips pass through solvent in the reservoir and through the die along with the tube, and means for forcing said tube through said die, said last mentioned means being constructed and arranged to fill the aperture in the die after said tube is passed therethrough.

6. Apparatus for applying strips of plastic material to a tube of plastic material comprising a controlled level reservoir for a circulating solvent for said tube and strips, a resilient die in the bottom of said reservoir and apertured for the passage of said tube and said strips, means for securing said strips to one end of the tube in spaced relation therearound, and guide means located partly in said reservoir for guiding strips of said material to said tube whereby said strips pass through solvent in the reservoir and through the die along with the tube, said die pressing the strips against the surface of the tube and preventing escape of solvent around the tube.

JOHN N. WHITEHOUSE.